Figure 1:
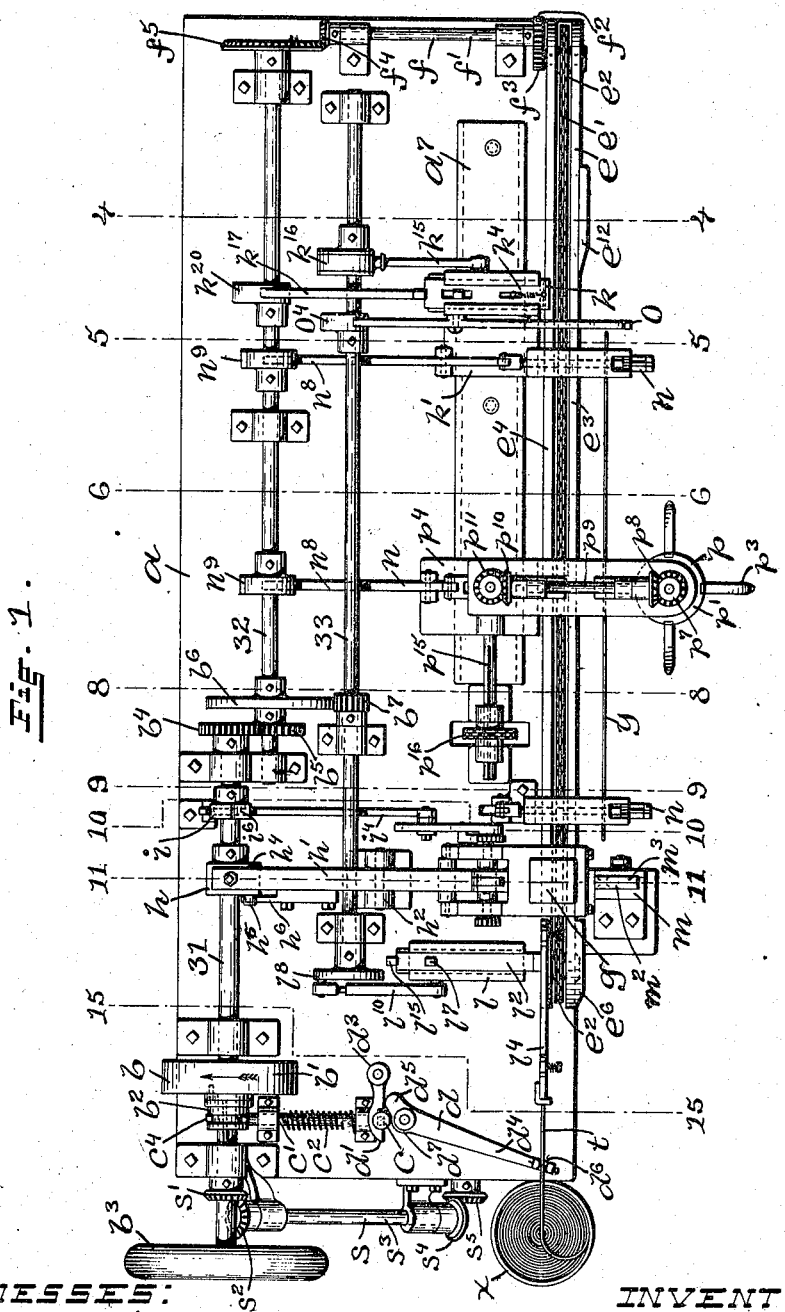

No. 866,916. PATENTED SEPT. 24, 1907.
W. H. CHURCH.
MACHINE FOR MANUFACTURING SHOE LACINGS.
APPLICATION FILED APR. 5, 1905.

11 SHEETS—SHEET 1.

WITNESSES: INVENTOR.

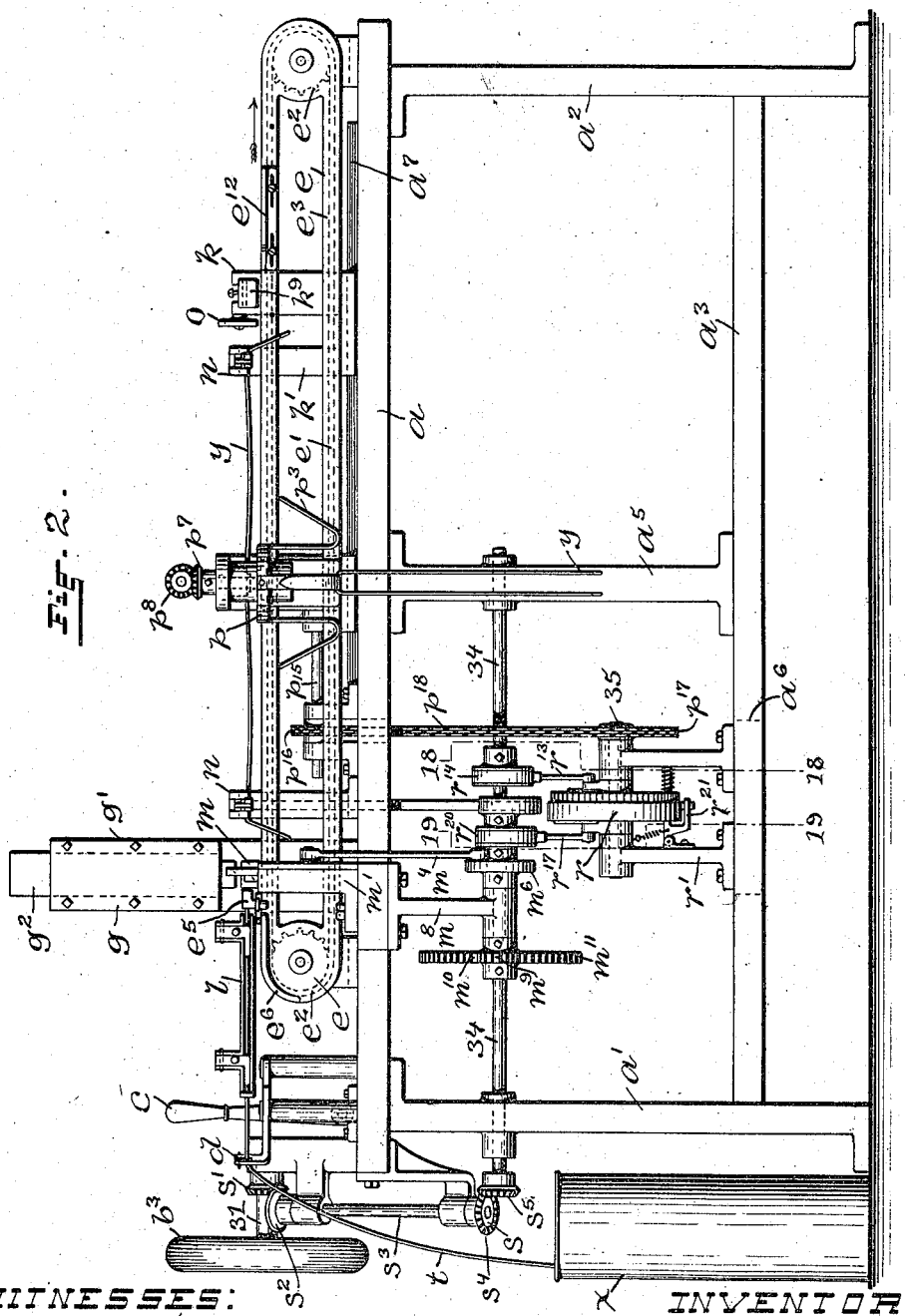

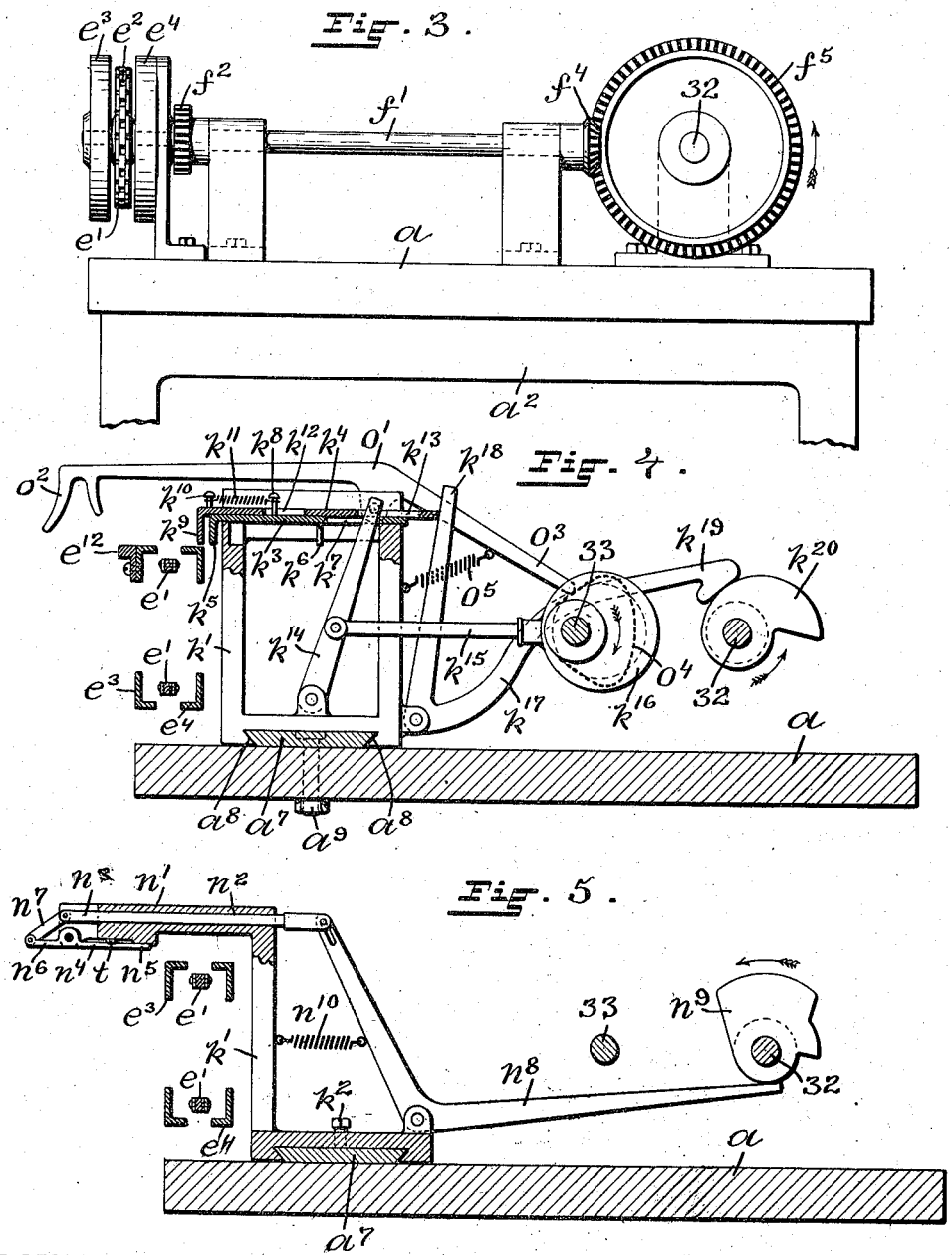

No. 866,916. PATENTED SEPT. 24, 1907.
W. H. CHURCH.
MACHINE FOR MANUFACTURING SHOE LACINGS.
APPLICATION FILED APR. 5, 1905.
11 SHEETS—SHEET 4.
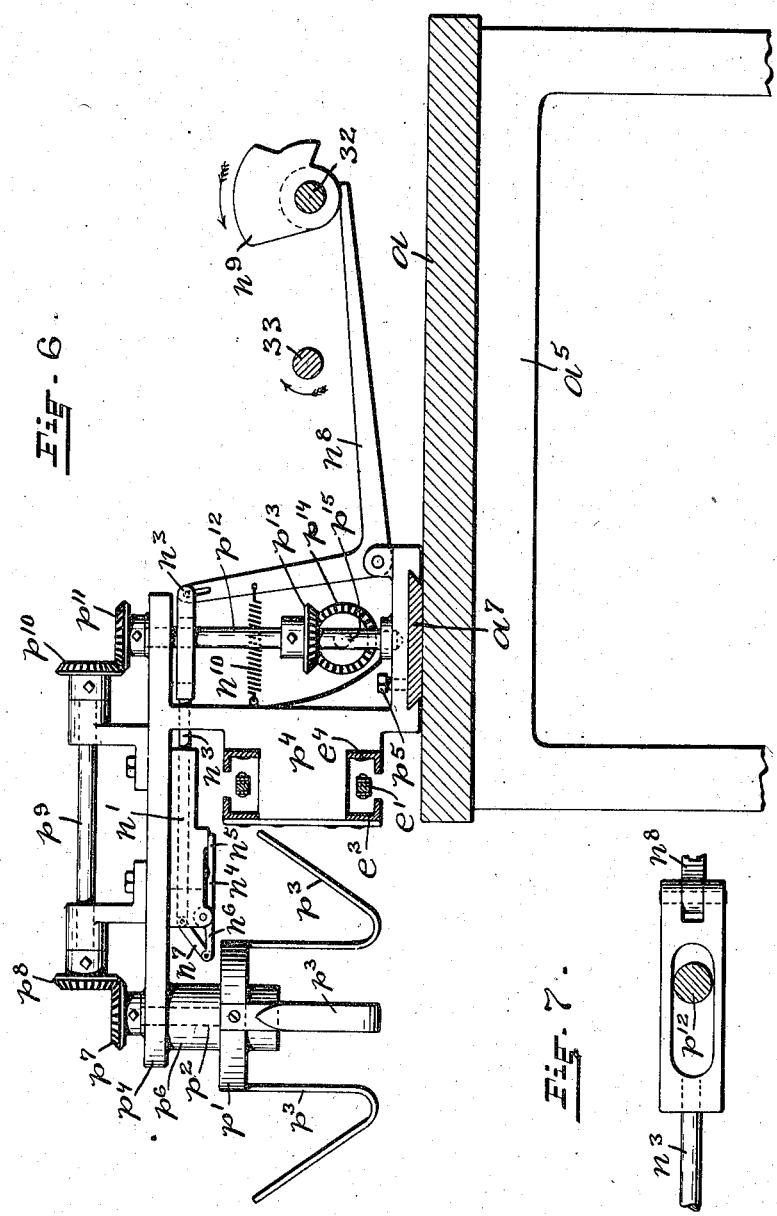
WITNESSES:
Ada E. Hagerty
Chas. H. Luther Jr.
INVENTOR:
William H. Church
by Joseph A. Miller Jr.
ATTORNEY.

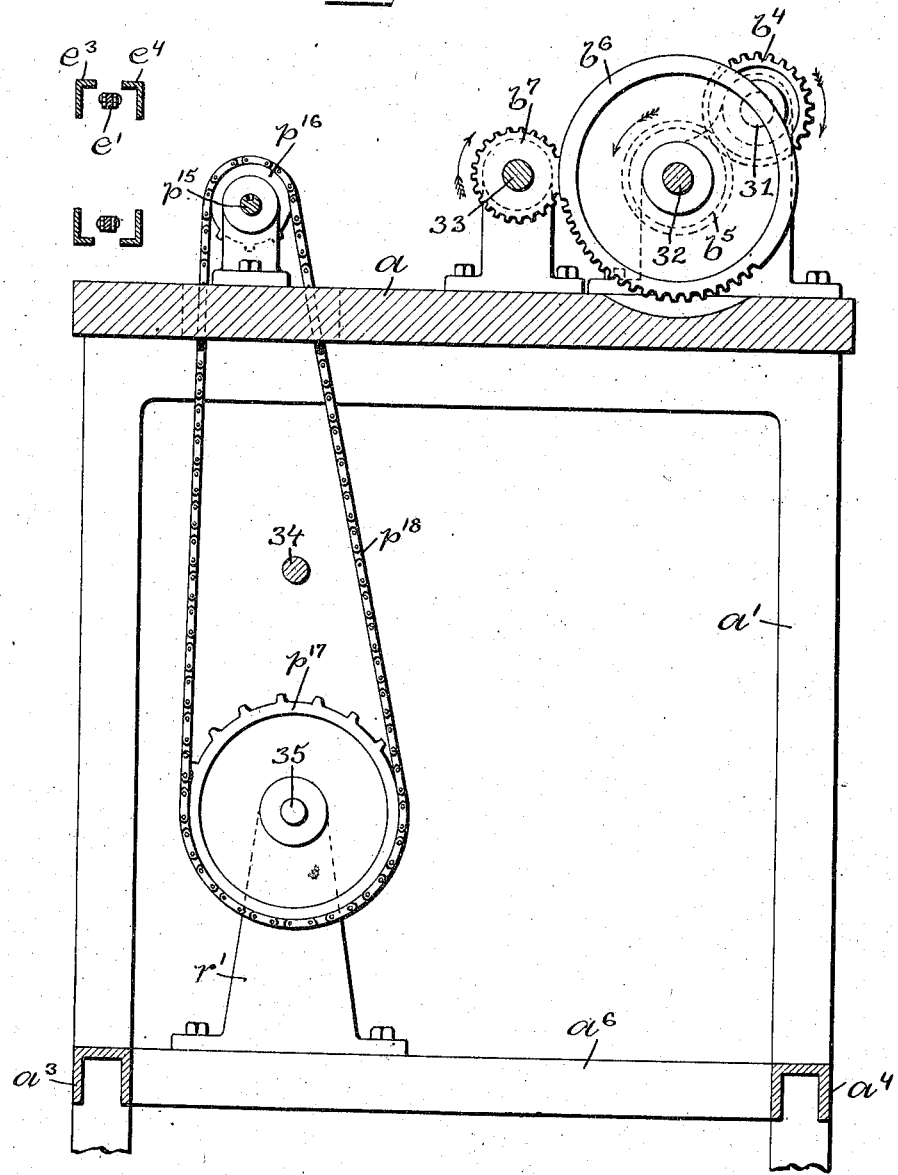

No. 866,916. PATENTED SEPT. 24, 1907.
W. H. CHURCH.
MACHINE FOR MANUFACTURING SHOE LACINGS.
APPLICATION FILED APR. 5, 1905.
11 SHEETS—SHEET 6.

WITNESSES: Ada E. Hagerty. Chas. H. Luther Jr.

INVENTOR: William H. Church by Joseph A. Miller Jr. ATTORNEY.

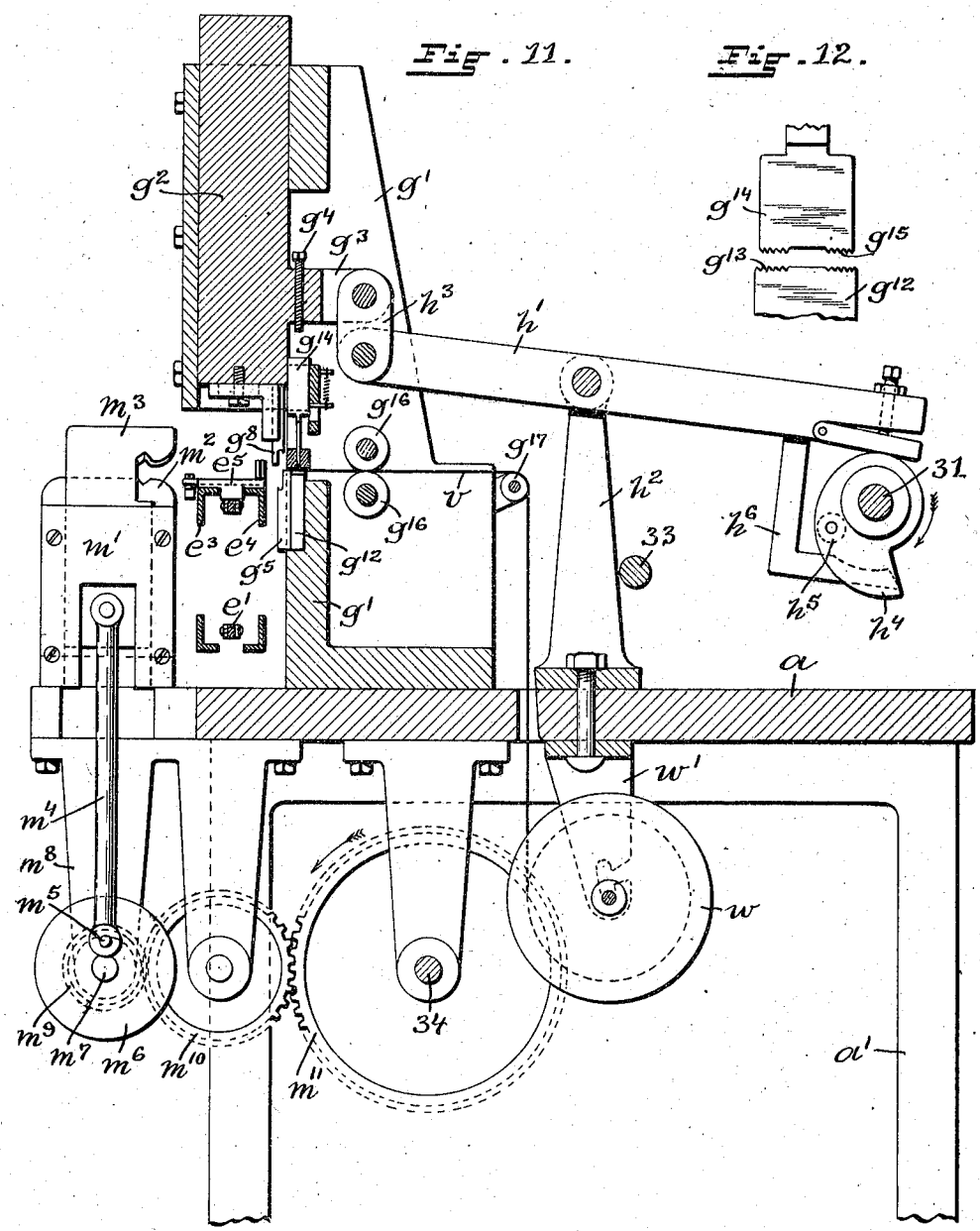

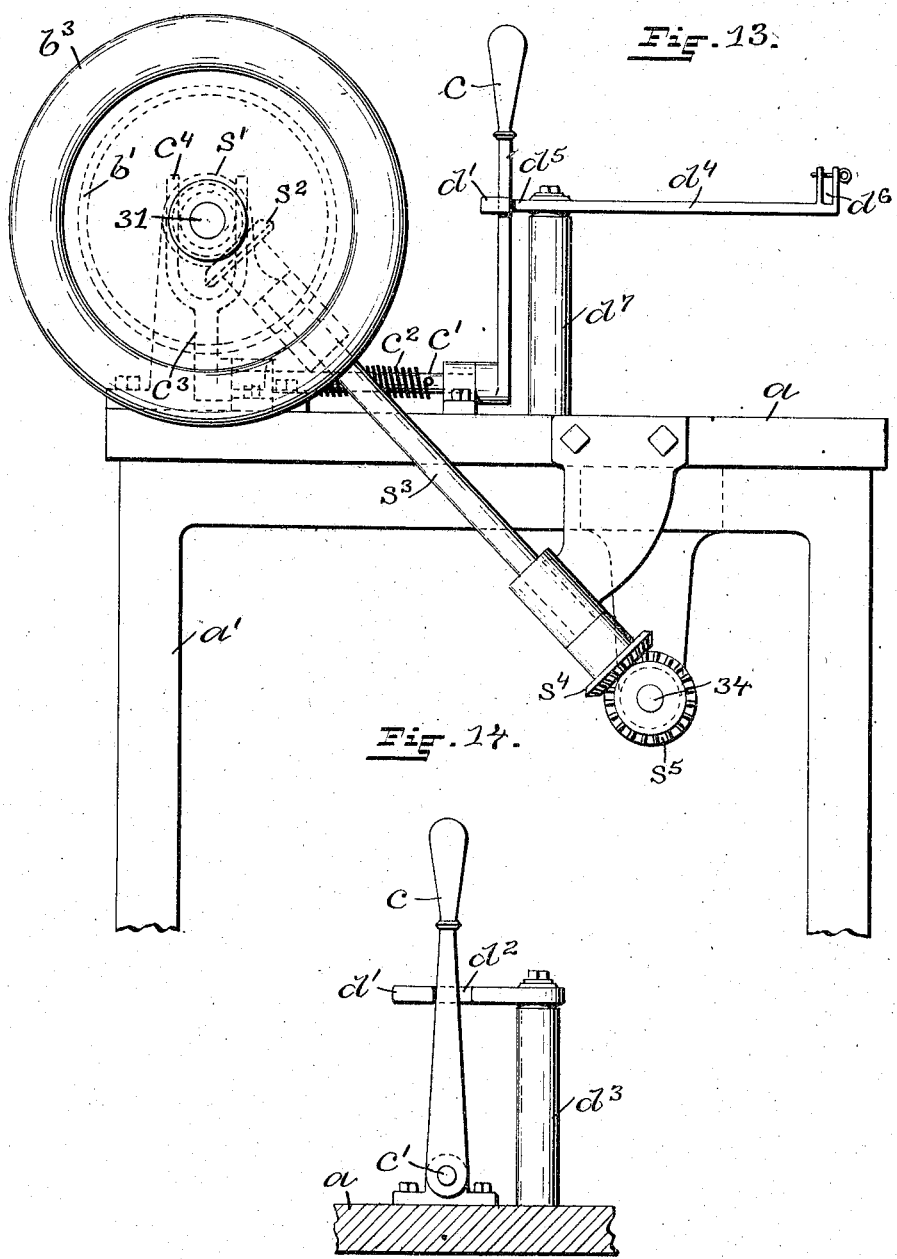

No. 866,916. PATENTED SEPT. 24, 1907.
W. H. CHURCH.
MACHINE FOR MANUFACTURING SHOE LACINGS.
APPLICATION FILED APR. 5, 1905.
11 SHEETS—SHEET 9.

WITNESSES:
Ada E. Hagerty
Chas. H. Luthen

INVENTOR:
William H. Church
J Joseph H Miller Jr.
ATTORNEY.

No. 866,916. PATENTED SEPT. 24, 1907.
W. H. CHURCH.
MACHINE FOR MANUFACTURING SHOE LACINGS.
APPLICATION FILED APR. 5, 1905.
11 SHEETS—SHEET 10.
Fig. 18.
Fig. 19.
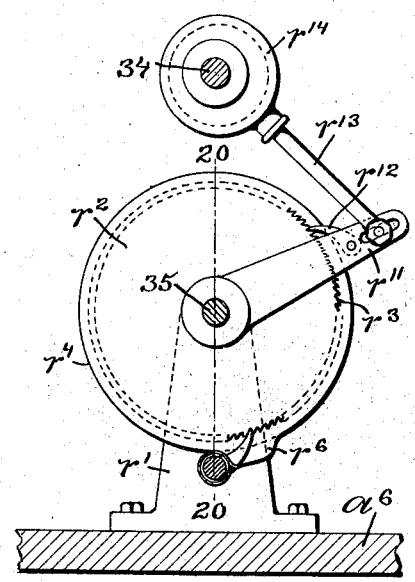
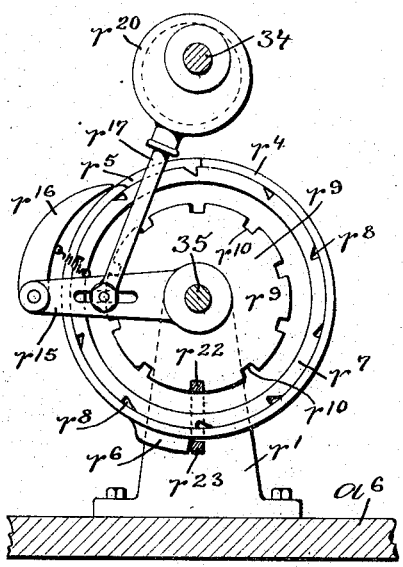
Fig. 20.
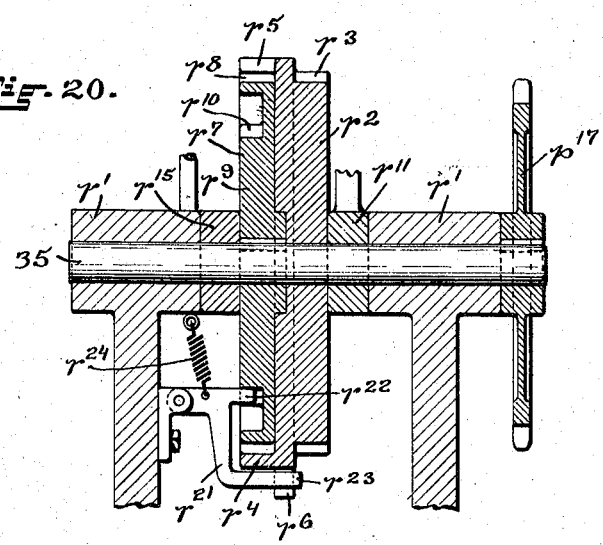
WITNESSES.
Ada E. Hagerty
Chas. H. Luther
INVENTOR:
William H. Church
Joseph A. Miller Jr.
ATTORNEY.

No. 866,916. PATENTED SEPT. 24, 1907.
W. H. CHURCH.
MACHINE FOR MANUFACTURING SHOE LACINGS.
APPLICATION FILED APR. 5, 1905.
11 SHEETS—SHEET 11.
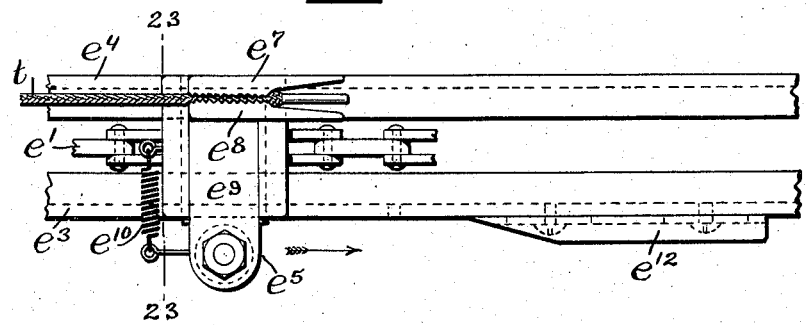
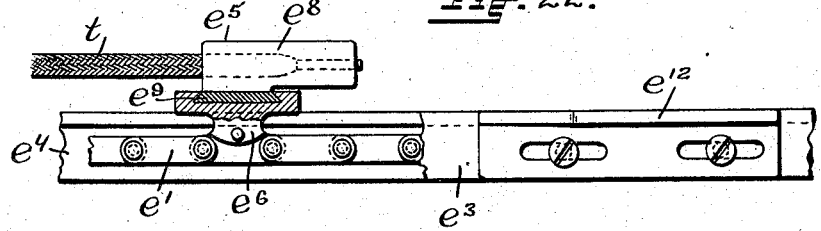
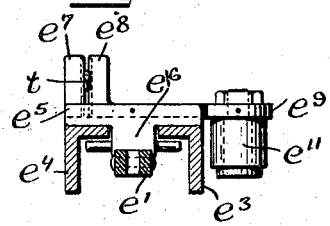
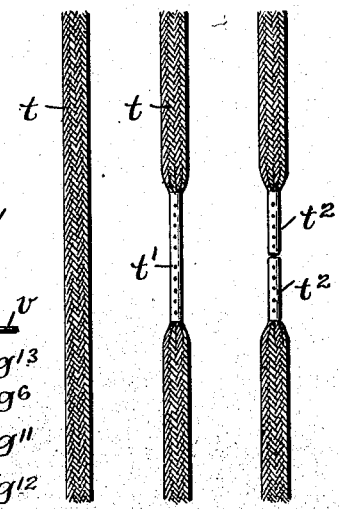
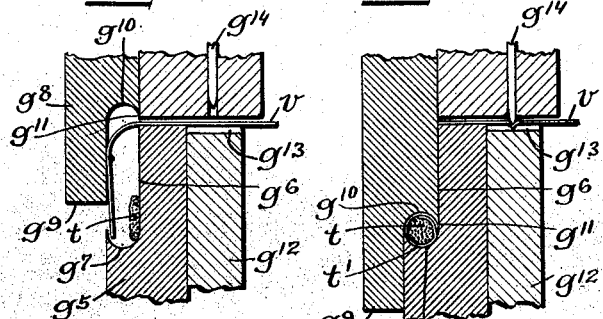
WITNESSES: Ada E. Hagerty, Chas. H. Luther Jr.
INVENTOR: William H. Church
by Joseph A. Miller Jr.
ATTORNEY

UNITED STATES PATENT OFFICE.

WILLIAM H. CHURCH, OF PAWTUXET, RHODE ISLAND, ASSIGNOR TO PROVIDENCE TIPPING MACHINE CO., OF PROVIDENCE, RHODE ISLAND.

MACHINE FOR MANUFACTURING SHOE-LACINGS.

No. 866,916.

Specification of Letters Patent.

Patented Sept. 24, 1907.

Application filed April 5, 1905. Serial No. 254,064.

*To all whom it may concern:*

Be it known that I, WILLIAM H. CHURCH, a citizen of the United States, residing at Pawtuxet, in the county of Providence and State of Rhode Island, have invented a new and useful Improvement in Machines for Manufacturing Shoe or Similar Lacings, of which the following is a specification.

This invention has reference to an improvement in machines for manufacturing shoe, corset or similar lacings, and more particularly to an improvement in machines for automatically applying metal tips to lacings.

The objects of my invention are to increase the production and lessen the cost of manufacturing shoe, corset or similar lacings, and I accomplish these objects by providing a machine that will automatically feed a continuous strip of lacing material into the machine the length of one lacing, apply a double metal tip to the strip of lacing material, cut the double tip and strip of lacing material, thereby forming a tip on each end of the severed lacing, loosely hold the completed lacing to remove the stretch from the same, release the lacing, thus allowing the finished lacing to fall onto one of a plurality of arms on a rotatable lacing receiver, count the lacings, and revolve the lacing receiver the distance of one arm for each gross (144) received by the lacing receiver, all in one operation of the machine.

My invention consists in the peculiar and novel construction of a machine for manufacturing shoe, corset or similar lacings, said machine having means for automatically feeding a continuous strip of lacing material into the machine the length of one lacing, means for adjusting the mechanism of the machine for different lengths of lacings, means for automatically stopping the machine if a knot occurs in the strip of lacing material, means for feeding intermittently a strip of sheet metal tip stock, means for cutting and forming the tip stock around the strip of lacing material to form a double tip, means for cutting the double tip and lacing to form a tip on each end of the severed lacing, means for holding the completed lacing to remove the stretch from the same and then releasing the lacing, means for receiving the finished lacing, means for counting the completed lacings, with driving mechanism and details of construction, as will be more fully set forth hereinafter.

The figures in the drawings are all shown with the operative parts in the position they would assume at the start of one operation of the machine to form the first complete shoe lacing of a gross of lacings.

Figure 9:
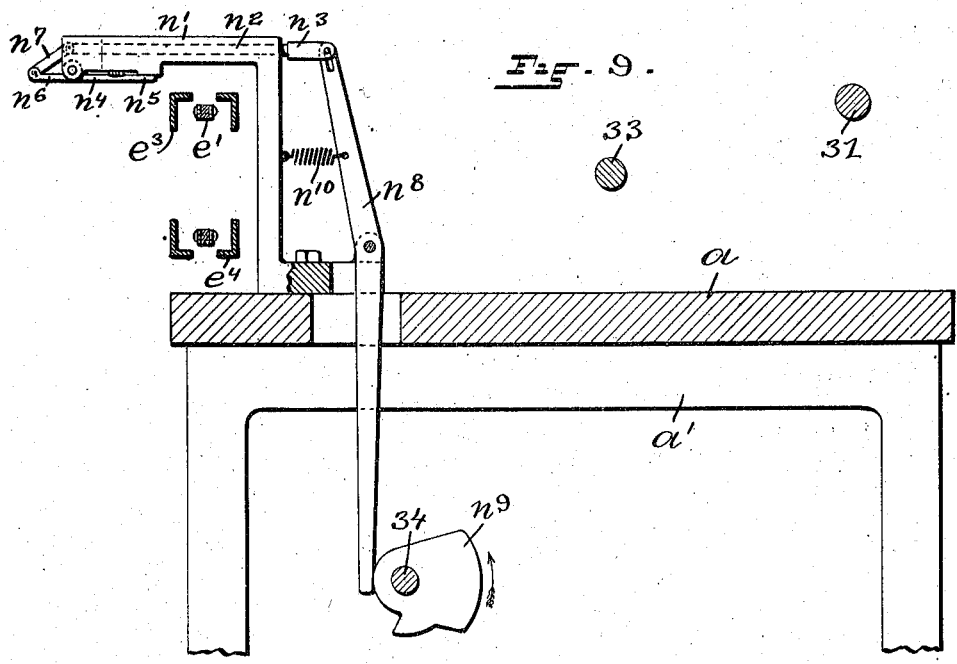
Figure 10:
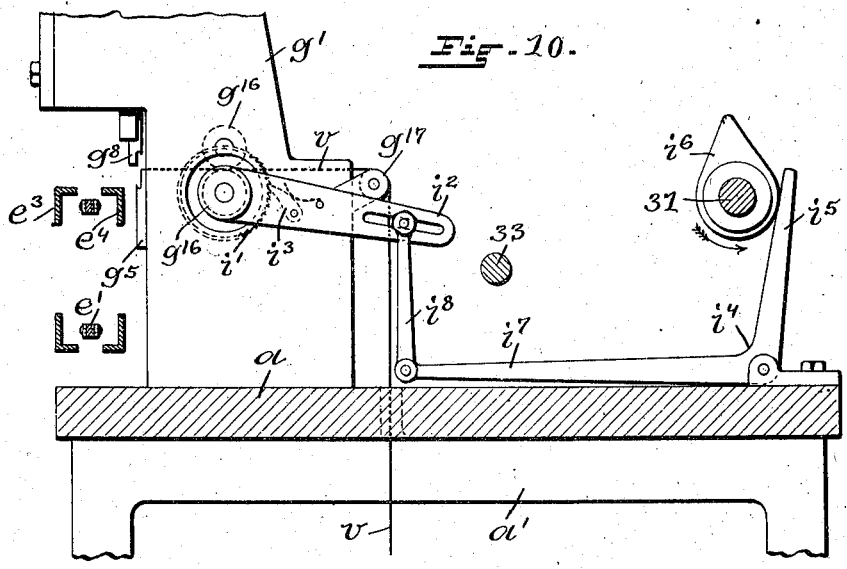
Figure 15:
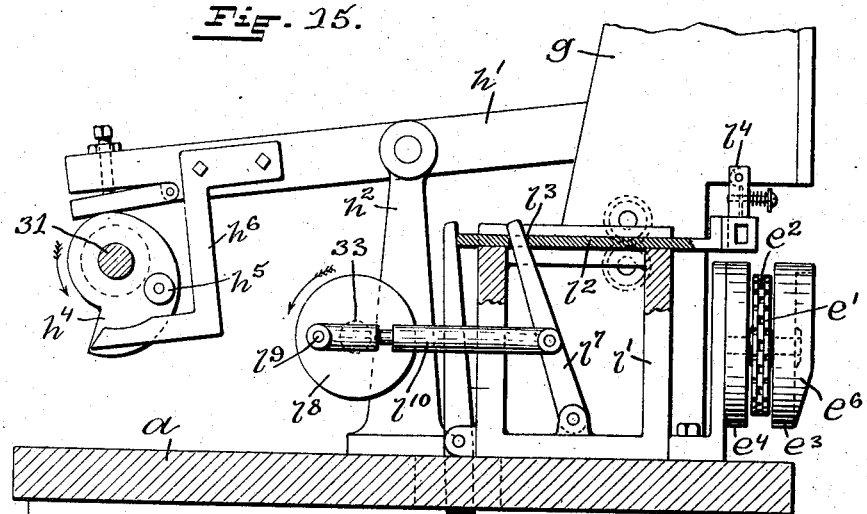
Figure 16:
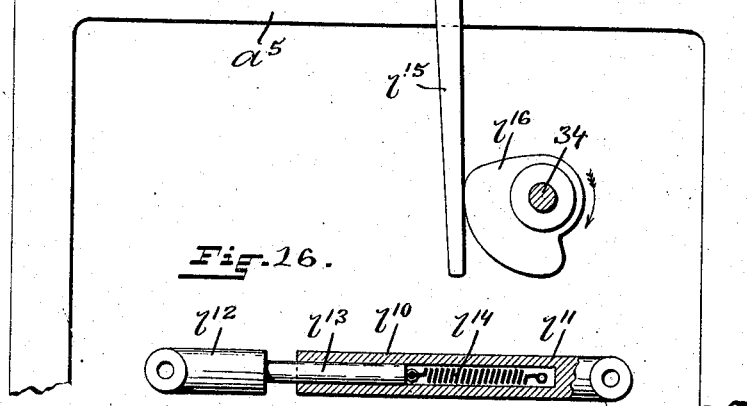
Figure 17:
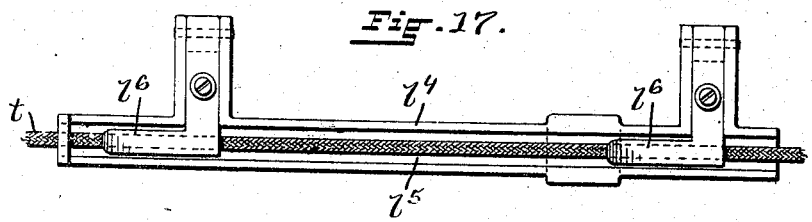

Figure 1 is a top plan view of my improved automatic machine for manufacturing shoe lacings, showing a continuous strip of lacing material being fed to the machine from a can on the floor and a completed shoe lacing held in the stretch eliminating mechanism to illustrate the operation of the machine. Fig. 2 is a front view of the machine, showing more particularly the lacing feed mechanism, the rotatable lacing receiver, and the counting mechanism. Fig. 3 is an enlarged view looking at the right hand end of the machine with the lower portion of the frame broken away, showing the lacing feed driving mechanism. Fig. 4 is an enlarged transverse sectional view taken on line 4 4 of Fig. 1, showing the right hand transverse lacing carrier mechanism and the release motion. Fig. 5 is an enlarged transverse sectional view taken on line 5 5 of Fig. 1, showing the right hand stretch eliminating mechanism for the outer end of the lacing. Fig. 6 is an enlarged transverse sectional view taken on line 6 6 of Fig. 1, showing the rotatable lacing receiver, the means for rotating the same, and the central stretch eliminating mechanism for the center of the lacing. Fig. 7 is a still further enlarged detail view of the connecting link in the stretch eliminating mechanism. Fig. 8 is an enlarged transverse sectional view through the machine taken on line 8 8 of Fig. 1, showing the sprocket chain connecting the counting mechanisms shaft with the receiver rotating mechanism, and the gearing connecting the cam shafts with the main driving shaft. Fig. 9 is an enlarged transverse sectional view taken on line 9 9 of Fig. 1, showing the left hand stretch eliminating mechanism for the inner end of the lacing. Fig. 10 is an enlarged transverse sectional view taken on line 10 10 of Fig. 1, showing the feed roll mechanism for intermittently feeding a strip of tip stock to the cutting and forming dies. Fig. 11 is an enlarged transverse sectional view through the machine taken on line 11 11 of Fig. 1, showing the tip forming mechanism, the operating mechanism for the same, the double tip cutting mechanism, and the reel for holding the strip of tip stock. Fig. 12 is a still further enlarged detail view of the indenting dies in the tip forming mechanism. Fig. 13 is an enlarged view looking at the left hand or power end of the machine with the lower part of the frame broken away, showing the lower cam shaft driving mechanism, the operating lever and the automatic stop motion. Fig. 14 is a detail view of the operating lever and part of the stop motion looking from the front of the machine. Fig. 15 is an enlarged transverse sectional view taken on line 15 15 of Fig. 1, showing the left hand transverse lacing carrier mechanism and the head end of the lacing feed mechanism. Fig. 16 is an enlarged detail sectional view of the spring actuated telescopic connecting rod of the left hand transverse lacing carrier mechanism. Fig. 17 is an enlarged detail face view of the tension guide forming a part of the left hand transverse lacing carrier mechanism. Fig. 18 is an enlarged sectional view taken on line 18 18 of Fig. 2, looking at the right hand side of the counting mechanism. Fig. 19 is a sectional view similar to Fig. 18 taken on line 19 19 of Fig. 2, looking at the left hand side of the counting mechanism. Fig. 20 is an enlarged detail sectional view taken on line 20 20 of Fig. 18, through the counting mechanism. Fig. 21 is an enlarged detail plan view of part of the lacing feed mechanism, showing the frame of the mechanism forming a track for the automatic lacing clamp carrier, and the cam on the frame for opening the jaws of the carrier to release the finished lacing. Fig. 22 is a face view of Fig. 21 partly in section, showing the construction of the chain and lacing clamp carrier. Fig. 23 is a transverse sectional view through the lacing feed mechanism taken on line 23 23 of Fig. 21, looking at the rear of the lacing clamp carrier. Fig. 24 is an enlarged detail sectional view through the cutting and forming dies, showing the dies in the open position, a strip of lacing material in the dies, the end of the tip stock in the dies in the position to be cut off and formed around the strip of lacing material, and the indenturing dies in the open position. Fig. 25 is a sectional view similar to Fig. 24, showing the dies in the closed position, the piece of tip stock cut off and formed around the strip of lacing material forming a double tip on the same, and the indenturing dies in the closed position to indenture the next piece of tip stock. Fig. 26 is a detail view of a piece of lacing material, showing the same as it enters the machine. Fig. 27 is a detail view of the lacing material after the dies have formed the double tip on the same, and Fig. 28 is a view of the same after the cutting mechanism has cut the double tip and lacing to form a tip on each end of the severed lacing.

In the drawings, $a$ indicates the bed of the machine, $b$ the main driving mechanism, $c$ the operating lever, $d$ the automatic stop motion, $e$ the lacing feed mechanism, $f$ the lacing feed driving mechanism, $g$ tip forming mechanism, $h$ the tip forming operating mechanism, $i$ the feed roll mechanism, $k$ the right hand transverse lacing carrier mechanism, $l$ the left hand transverse lacing carrier mechanism, $m$ the tip cutting mechanism, $n$ $n$ $n$ the stretch eliminating mechanisms, $o$ the release motion, $p$ the rotatable lacing receiver, $r$ the counting mechanism, $s$ the lower cam shaft driving mechanism, $t$ the strip of lacing material, $u$ the thin metal tip stock, $w$ the tip stock reel, $x$ the lacing material supplying can, $y$ the completed lacing, 31 the main driving shaft, 32 the back cam shaft, 33 the center cam shaft, 34 the lower shaft, and 35 the counting mechanism shaft.

The bed $a$ of the machine is supported on the end frames $a'$ and $a^2$ connected by the front strut $a^3$ and the back strut $a^4$ which supports the center frame $a^5$ and the cross strut $a^6$, as shown in Figs. 2 and 8. A guide rail $a^7$ having the undercut ways $a^8$ $a^8$ is secured to the top of the bed $a$, adjacent the front, by the bolts $a^9$ $a^9$, as shown in Fig. 4.

The main driving mechanism $b$ consists of a loose pulley $b'$ on the driving shaft 31 which is supported in bearings on the bed of the machine, as shown in Fig. 1. A clutch $b^2$ splined to the driving shaft operates to disconnect or connect the pulley to the shaft, and a balance wheel $b^3$ is secured to the outer end of the driving shaft. On the inner end of the driving shaft 31 is secured a gear $b^4$ meshing with a gear $b^5$ on the back cam shaft 32. A slip gear $b^6$ is secured on the back cam shaft 32 in a position to mesh with a slip pinion $b^7$ secured to the center cam shaft 33, as shown in Figs. 1 and 8. By this construction the center cam shaft 33 has an intermittent motion the duration of which is approximately one-third the revolution of the back cam shaft 32. The cam shafts 32 and 33 are supported in bearings secured to the bed of the machine, as shown in Fig. 1, and the lower cam shaft 34 is supported in bearings under the bed $a$ of the machine, as shown in Fig. 2.

The operating lever $c$ is secured at its lower end to the transverse rod $c'$ supported in bearings on the bed $a$. A coiled spring $c^2$ on the rod is connected to the rod and to a bearing supporting the rod. A vertical arm $c^3$ having forked upper end $c^4$ is secured on the rear end of the rod in a position for the forked end to engage with an annular groove in the movable part of the clutch $b^2$, as shown in Figs. 1 and 13. The tension of the spring $c^2$ operates to open the clutch $b^2$ when the operating lever $c$ is released.

The automatic stop motion $d$ consists of a latch $d'$ having a notch $d^2$ and pivotally secured to the upper end of a stud $d^3$ which in turn is secured to the bed $a$, in a position for the notch in the latch to engage with the operating lever $c$, as shown in Figs. 1 and 14. A release lever $d^4$ having the cam end $d^5$ and the eye $d^6$ in the forward end is pivotally secured to a stud $d^7$ which in turn is secured to the bed $a$, in a position for the cam end $d^5$ to engage with the latch $d'$. The strip of lacing material $t$ passes through the eye $d^6$ in the forward end of the release lever $d^4$. If a knot occurs in the lacing material it catches on the eye end of the release lever and moves the forward or eye end of the release lever $d^4$ inward. The cam end $d^5$ of the release lever acting on the latch $d'$ releases the latch from the operative lever $c$ and through the tension of the spring $c^2$ opens the clutch $b^2$ and automatically stops the machine.

The lacing feed mechanism $e$ consists of an endless sprocket chain $e'$ running on the sprocket wheels $e^1$ $e^2$. These sprocket wheels are supported in bearings between the side frames $e^3$ and $e^4$ at each end of the frames, which are secured to the bed $a$ at the front of the machine. The side frames $e^3$ and $e^4$ extend approximately the length of the machine and form continuous tracks for the lacing clamp carrier $e^5$, as shown in Fig. 2. A cam edge $e^6$ is formed on the left hand edge of the frame $e^3$ to open the lacing clamp carrier $e^5$ to receive the end of the lacing material, and a cam slide $e^{12}$ is adjustably secured to the frame $e^3$ adjacent the right hand end to open the lacing clamp carrier to release the completed lacing. The lacing clamp carrier $e^5$ is supported on the edge of the frames $e^3$ and $e^4$ and has the inwardly-extending lug $e^{16}$ forming one of the center blocks of the chain $e'$, as shown in Figs. 22 and 23. The lug $e^6$ extends through the slot formed by the side frames $e^3$ and $e^4$ the inner edges of which form a guide for the carrier $e^5$. An upwardly-extending fixed jaw $e^7$ is formed on the carrier $e^5$ on a line with the frame $e^4$ and a movable jaw $e^8$ is formed on the slide $e^9$ which is held in ways in a transverse position in the carrier $e^5$. A coiled spring $e^{10}$ is connected to the carrier $e^5$ and to the slide $e^9$, the tension of the coiled spring holding the jaws in the closed position. A roll $e^{11}$ is rotatably secured to the end of the slide $e^9$ in a position for the cam edges $e^6$ and $e^{12}$ on the frame $e^3$ to engage with the roll and open the jaws against the tension of the spring $e^{10}$.

The lacing feed driving mechanism $f$ consists of a transverse shaft $f'$ supported in bearings secured to the bed $a$ at the right hand end of the machine. A gear $f^2$ is secured to the forward end of the shaft and this gear meshes with a pinion $f^3$ secured to the shaft of the sprocket wheel $e^2$ of the lacing feed mechanism $e$. A bevel gear pinion $f^4$ is secured to the rear end of the shaft $f'$ and meshes with a bevel gear $f^5$ secured to the end of the back cam shaft 32, as shown in Figs. 1 and 3. The ratio of the gearing is such that one revolution of the main driving shaft will carry the lacing carrier $e^5$ once around the frame of the lacing feed mechanism.

The tip forming mechanism $g$ consists of a frame $g'$ supporting a vertical reciprocating plunger $g^2$ and secured to the bed $a$ in a position to bring the plunger over the lacing feed mechanism $e$, adjacent the left hand end of the feed mechanism. A lug $g^3$ is formed on the back of the plunger through which the adjustable bolt $g^4$ extends, as shown in Fig. 11. A fixed lower die $g^5$ is secured to the face of the frame $g'$ under the plunger $g^2$ and has a depressed face $g^6$ merging into a semi-circular recess $g^7$ which extends transversely across the die. An upper die $g^8$, having the projecting end $g^9$, the semi-circular recess $g^{10}$ which extends transversely across the die and forms the cutting edge $g^{11}$, is secured to the lower end of the plunger $g^2$. The semi-circular recesses $g^7$ and $g^{10}$ coincide when the dies are closed and form a double tip on the lacing from a blank cut off by the cutting edge $g^{11}$ from the strip of tip stock $u$. The end $g^9$ of the upper die $g^8$ in its downward movement strikes the end of the tip stock and bends it over and into the semi-circular recess $g^7$ in the fixed die, as shown in Fig. 24. The cutting edge of the upper die now cuts off the tip blank and the coinciding of the recesses in the dies forms the double tip $t'$ by forcing the tip blank around the strip of lacing material, as shown in Fig. 25. A fixed die $g^{12}$ having the indentures $g^{13}$ $g^{13}$ is secured to the frame $g'$ back of the die $g^5$, and a reciprocating die $g^{14}$ having the points $g^{15}$ $g^{15}$ is held under spring tension between the plunger $g^2$ and a portion of the frame $g'$. A downward movement of the plunger causes the lower end of the bolt $g^4$ to strike the reciprocating die $g^{14}$ and force the points $g^{15}$ $g^{15}$ into the tip stock, thus forming points on the inside of the tips to assist in securing the tips to the lacings. The feed rolls $g^{16}$ are supported in suitable bearings in the frame $g'$ in a position to feed the tip stock $u$ between the dies, and a guide roll $g^{17}$ for the tip stock is supported in bearings on the frame $g'$.

The tip forming operating mechanism $h$ consists of a lever $h'$ pivotally secured near its center to the support $h^2$ which is secured to the bed $a$ in a position to bring the link $h^3$ on the forward end of the lever under the lug $g^3$ on the plunger $g^2$ to which the link is pivotally secured, as shown in Fig. 11. A cam $h^4$ having the side roll $h^5$ is secured to the main driving shaft 31 under the rear end of the lever $h'$ and an L-shaped arm $h^6$ is secured to the rear end of the lever. The cam $h^4$ raises the rear end of the lever $h'$ and depresses the plunger $g^2$, and the roll $h^5$ on the cam striking the L-shaped arm $h^6$ lowers the rear end of the lever and raises the plunger.

The feed roll mechanism $i$ consists of a ratchet $i'$ secured to the shaft of the lower feed roll $g^{16}$. A lever $i^2$ is loosely mounted on the feed roll shaft and carries a pawl $i^3$ in a position to engage with the ratchet $i'$, as shown in broken lines in Fig. 10. A bell crank lever $i^4$ is pivotally secured to the bed $a$ in a position for the rear end $i^5$ of the lever to engage with a cam $i^6$ secured to the main shaft 31. The forward end $i^7$ of the bell crank lever $i^4$ is pivotally connected to the link $i^8$ which in turn is pivotally secured to the pawl lever $i^2$. By this construction, for each revolution of the cam $i^6$ on the main shaft 31, the feed rolls $g^{16}$ are revolved to feed the tip stock from the reel $w$ to the dies the equivalent of one double tip.

The right hand transverse lacing carrier mechanism $k$ consists of a frame $k'$ adjustably secured to the guide rail $a^7$ by the set bolt $k^2$ approximately the length of one lacing from the lacing tip forming mechanism $g$. The upper portion of the frame $k'$ is constructed to support the lower slide $k^3$ and the upper slide $k^4$. The lower slide has an L-shaped forward end forming the jaw $k^5$, the downwardly-extending pin $k^6$, the slot $k^7$, and the upwardly-extending pin $k^8$. The upper slide has an L-shaped forward end forming the jaw $k^9$, the upwardly-extending pin $k^{10}$ connected to the pin $k^8$ on the lower slide by the coiled spring $k^{11}$, the slot $k^{12}$ for the pin $k^6$, and the slot $k^{13}$. The rear end of the upper slide $k^4$ extends beyond the frame $k'$, and the inner surface of the jaws $k^5$ and $k^9$ are roughened to securely hold the end of the lacing. A lever $k^{14}$ is pivotally secured at its lower end to the frame $k'$ and extends upward through the slot $k^7$ in the lower slide and the slot $k^{13}$ in the upper slide, as shown in Fig. 4. A rod $k^{15}$ connects the lever $k^{14}$ with an eccentric $k^{16}$ on the center cam shaft 33. A bell crank lever $k^{17}$ is pivotally secured to the frame $k'$ in a position for the upwardly-extending arm $k^{18}$ to bear on the rear end of the upper slide $k^4$ and for the rearwardly-extending arm $k^{19}$ to engage with the cam $k^{20}$ secured to the back cam shaft 32. The upper slide $k^4$ moves forward by action of the cam $k^{20}$ through the lever $k^{17}$ to open the jaws $k^5$ and $k^9$ for the lacing carrier $e^5$ to pass through. The jaws then close on the lacing by the action of the spring $k^{11}$. Then both slides go forward with the jaws in the closed position by the action of the eccentric $k^{16}$ through the lever $k^{14}$ until the pin $k^6$ on the lower slide comes into contact with the frame $k'$, when the upper slide goes forward against the tension of the spring $k^{11}$ to open the jaws $k^9$ and $k^5$ and release the lacing, allowing the lacing to drop onto an arm of the rotatable lacing receiver $p$.

The left hand transverse lacing carrier mechanism $l$ consists of a frame $l'$ secured to the bed $a$ at the left of the tip forming mechanism $g$. The upper portion of the frame $l'$ is constructed to support the slide $l^2$ having the slot $l^3$, as shown in Fig. 15. The rear end of the slide $l^2$ projects beyond the frame $l'$ and the forward end is secured to the tension guide $l^4$ to bring the guide over the lacing feed mechanism $e$. The tension guide $l^4$ is constructed to have the groove $l^5$ for the strip of lacing material $t$ and the spring actuated tension arms $l^6$ $l^6$ adapted to bear on the strip of lacing material in the groove $l^4$, as shown in Fig. 17. A lever $l^7$ is pivotally secured at its lower end to the frame $l'$ and extends upward through the slot $l^3$ in the slide $l^2$. A disk $l^8$ having the eccentric pin $l^9$ is secured to the end of the center cam shaft 33. A telescopic connecting rod $l^{10}$ is pivotally connected to the lever $l^7$ and to the eccentric pin $l^9$ on the disk $l^8$. This connecting rod $l^{10}$ consists of a tubular member $l^{11}$ and a member $l^{12}$ having the stem $l^{13}$ adapted to enter the tubular member in which it is held by a coiled spring $l^{14}$, one end of which is secured in the tubular member, and the other end to the end of the stem $l^{13}$, as shown in Fig. 16. The tension of the spring $l^{14}$ acts to draw the members $l^{11}$ and $l^{12}$ together. A vertical lever $l^{15}$ is pivotally secured to the frame $l'$. This lever extends through an opening in the bed $a$, the upper end bearing on the rear end of the slide $l^2$ and the lower end engaging with the cam $l^{16}$ secured on the lower cam shaft 34. The slide $l^2$ moves forward to bring the guide $l^4$ between the jaws of the lacing carrier $e^5$ by the action of the cam $l^{16}$ through the lever $l^{15}$ against the tension of the spring in the connecting rod $l^{10}$. The jaws of the carrier now pass by on each side of the guide $l^4$ and clamp onto the lacing. The slide $l^2$ now moves back with the guide and places the lacing in the dies of the tip forming mechanism $g$, by the action of the cam $l^{16}$ and the tension of the spring in the connecting rod $l^{10}$. The slide $l^2$ now moves into its extreme forward position to bring the double tip on the lacing into the tip cutting mechanism $m$ by the action of the disk $l^8$, eccentric pin $l^9$, through the telescopic connecting rod $l^{10}$ and the lever $l^7$.

The tip cutting mechanism $m$ consists of a frame $m'$ constructed to support the fixed cutting blade $m^2$ and the vertical reciprocating cutting blade $m^3$. This frame $m'$ is secured to a projecting portion of the bed $a$ on the front of the machine in a position to bring the cutting blades $m^2$ and $m^3$ opposite the center of the dies of the tip forming mechanism $g$, as shown in Figs. 1, 2 and 11. A connecting rod $m^4$ is pivotally connected to the reciprocating cutting blade $m^3$ and to an eccentric pin $m^5$ on a disk $m^6$. This disk is secured to a shaft $m^7$ supported in the bearing $m^8$ secured to the underside of the bed $a$. A gear $m^9$ is secured to the opposite end of the shaft $m^7$ which meshes with the intermediate gear $m^{10}$, which in turn meshes with the gear $m^{11}$ on the lower cam shaft 34. By this construction the cutting blade $m^3$ has a continuous vertical reciprocating motion timed so as to cut the double tip on the lacing in the center, when the slides of the transverse lacing carrier mechanisms have reached their forward limit of movement.

The stretch eliminating mechanisms $n$ $n$ $n$ consist of a right hand, a central, and a left hand mechanism, all adapted to perform the function of loosely holding the cut lacing until the stretch of the same is eliminated. Each stretch eliminating mechanism consists of a horizontal support $n'$ having the bore $n^2$ in which is the rod $n^3$. A finger $n^4$ having the long inner end $n^5$ and the short outer end $n^6$ is pivotally secured to the underside of the support $n'$ at its forward end, and a link $n^7$ pivotally connects the forward end of the rod $n^3$ with the short outer end $n^6$ of the finger. A reciprocating motion of the rod $n^3$ in the support $n'$ acts to raise or lower the inner end $n^5$ of the finger $n^4$. In the right hand mechanism the support $n'$ forms a part of the frame $k'$, as shown in Fig. 5. A bell crank lever $n^8$ is pivotally secured to the frame $k'$, the forward end of the lever being pivotally connected with the rear end of the rod $n^3$, and the rear end of the lever engaging with the cam $n^9$ on the back cam shaft 32. A coiled spring $n^{10}$ is connected to the forward end of the lever $n^8$ and to the frame $k'$. In the central mechanism the support $n'$ forms a part of the frame $p^4$ which supports the rotatable lacing receiver $p$, as shown in Fig. 6, and in the left hand mechanism the support $n'$ is in the form of a bracket secured to the bed $a$, as shown in Fig. 9. The lever $n^8$ in this case extends through an opening in the bed $a$ and engages with a cam $n^9$ on the lower cam shaft 34. As the slides of the transverse lacing carrier mechanisms $k$ and $l$ move forward to bring the lacing into the cutting mechanism $m$ and over the rotatable lacing receiver $p$, the cams $n^9$ $n^9$ are timed to lower the inner ends $n^5$ $n^5$ of the fingers $n^4$ $n^4$ against the tension of the springs $n^{10}$ $n^{10}$, to receive the lacing. The fingers now close on the lacing and hold the same to eliminate the stretch after the lacing is cut. The cams are timed so as to open the right and left fingers slightly ahead of the central finger, the completed lacing when released falling in the form of an inverted V onto an arm of the rotatable lacing receiver.

The release motion $o$ consists of an arm $o'$ pivotally secured near its center to the top of the frame $k'$. This arm extends out over the lacing feed mechanism $e$ and has the forked end $o^2$ on a line with the lacing when the lacing is in its extreme forward position. The rear end $o^3$ of the arm engages with the cam $o^4$ on the center cam shaft 33, as shown in heavy dotted lines in Fig. 4. A coiled spring $o^5$ is connected to the rear end $o^3$ of the arm and to the frame $k'$, the tension of the spring holding the rear end of the arm in engagement with the cam. As the slides $k^3$ and $k^4$ of the right hand transverse lacing carrier mechanism $k$ reach their extreme forward position, the jaws $k^5$ and $k^9$ open to release the lacing. Should the roughened surface of the jaws retain the lacing, the cam $o^4$ is timed so as to depress the forked end $o^2$ of the arm $o'$ and force the lacing out of the jaws.

The rotatable lacing receiver $p$ consists of a disk $p'$ secured to the lower end of the vertical shaft $p^2$ and having the four arms $p^3$ $p^3$ secured to the edge of the disk at equal distances apart. The arms are carried downward and then bent upward and outward to form hook-shaped arms, as shown in Fig. 6. A frame $p^4$ adapted to support the rotatable lacing receiver $p$ on the front of the machine is adjustably secured to the guide rail $a^7$ by the set bolt $p^5$. A bearing $p^6$ is formed on the forward end of the frame $p^4$ for the vertical shaft $p^2$, which has on its upper end the bevel gear $p^7$. A horizontal shaft $p^9$ is supported in bearings on the top of the frame $p^4$ and has the bevel gear $p^8$ on its forward end meshing with the bevel gear $p^7$ on the vertical shaft $p^2$. A bevel gear $p^{10}$ on the rear end of the shaft $p^9$ meshes with a bevel gear $p^{11}$ on a vertical shaft $p^{12}$ supported in bearings in the frame $p^4$. A bevel gear $p^{13}$ on the shaft $p^{12}$ meshes with a bevel gear $p^{14}$ on a horizontal shaft $p^{15}$ supported in bearings on the bed $a$, as shown in Fig. 1. A sprocket wheel $p^{16}$ is loosely splined to the shaft $p^{15}$ to allow for adjustment of the frame $p^4$ on the guide rail $a^7$, and this sprocket wheel is connected to a sprocket wheel $p^{17}$ on the counting mechanism shaft 35 by a sprocket chain $p^{18}$, as shown in Fig. 8. By this construction one-tenth of a revolution of the sprocket $p^{17}$ on the counting mechanism shaft 35 will revolve the rotatable lacing receiver $p$ one-quarter of a revolution.

The counting mechanism $r$ consists of a shaft 35 supported on the bearings $r'$ $r'$ secured to the cross strut $a^6$ of the machine, as shown in Fig. 8. A ratchet disk $r^2$, having one hundred and sixty (160) of the ratchet teeth $r^3$ $r^3$ on its periphery, the peripheral flange $r^4$ in which is the opening $r^5$ the length of which is the equivalent of sixteen (16) of the ratchet teeth $r^3$ $r^3$, and the cam $r^6$ extending radially from the periphery, is loosely mounted on the shaft 35, as shown in Fig. 20. A notched disk $r^7$, having ten (10) notches $r^8$ $r^8$ on its periphery and a hub $r^9$ having ten (10) recesses $r^{10}$ $r^{10}$ in its periphery, is firmly secured to the shaft 35. A lever $r^{11}$ is loosely mounted on the shaft 35 adjacent the ratchet disk $r^2$, and a pawl $r^{12}$ is pivotally secured to the lever in a position for the pawl to engage with the ratchet teeth $r^3$ $r^3$ on the disk, as shown in Fig. 18. A connecting rod $r^{13}$ connects the free end of the lever $r^{11}$ with an eccentric $r^{14}$ on the lower cam shaft 34. One revolution of the eccentric $r^{14}$ revolves the ratchet disk $r^2$ one tooth. A lever $r^{15}$ is loosely mounted on the shaft 35 adjacent the notched disk $r^7$, and a pawl $r^{16}$ is pivotally secured to the lever in a position to engage with the notches $r^8$ $r^8$ through the opening $r^5$ in the flange of the ratchet disk, as shown in Fig. 19. A connecting rod $r^{17}$ is connected to the lever $r^{15}$ and to an eccentric $r^{20}$ on the lower cam shaft 34. One revolution of the eccentric $r^{20}$ revolves the notched disk $r^7$ one notch and the sprocket wheel $p^{17}$ one-tenth of a revolution. A latch $r^{21}$ is pivotally secured to the bearing $r'$ on the notched disk side. This latch is constructed to have the projecting end $r^{22}$ adapted to enter the recesses $r^{10}$ $r^{10}$ in the hub of the notched disk, and the L-shaped end $r^{23}$. A coiled spring $r^{24}$ is secured to the latch and to the bearing to hold the latch in its normal or locked position. The cam $r^6$ on the ratchet disk engages with the L-shaped end of the latch and depressing the latch against the tension of the spring $r^{24}$ releases the projecting end $r^{22}$ from a recess $r^{10}$ in the disk and allows the disk, shaft and sprocket wheel to revolve. The pawl $r^{12}$ takes up one tooth on the ratchet disk $r^2$ for each finished lacing received by the rotatable lacing receiver $p$. When the ratchet disk $r^2$ has revolved one hundred and forty-four (144) teeth the cam $r^6$ has acted to release the latch $r^{21}$ and the opening $r^5$ in the flange on the ratchet disk has come into position for the pawl $r^{16}$ to pass through the opening and engage with a notch $r^8$ on the periphery of the notched disk $r^7$. The next upward movement of the pawl $r^{16}$ revolves the notched disk $r^7$, the shaft 35 and the sprocket wheel $p^{17}$ one-tenth of a revolution and through the mechanism connecting the sprocket wheel $p^{17}$ with the rotatable lacing receiver $p$ revolves the receiver one-quarter of a revolution, thus moving the arm that has received a gross of the finished lacings to one side and bringing an empty arm into position to receive the next gross of lacings.

The lower cam shaft driving mechanism $s$ consists of a bevel gear $s'$ secured to the main driving shaft 31. This bevel gear $s'$ meshes with a bevel gear $s^2$ secured to the upper end of the shaft $s^3$ which is supported in bearings on the frame of the machine, as shown in Figs. 2 and 13. A bevel gear $s^4$ is secured to the lower end of the shaft $s^3$ and this gear meshes with a bevel gear $s^5$ secured to the outer end of the lower cam shaft 34. These gears all have the same pitch and thus revolve the lower cam shaft at the same ratio as the main driving shaft.

The reel $w$ is adapted to hold a continuous strip of the thin metal tip stock $u$ the width of which forms the length of the double tip $t'$, shown in Fig. 27. This reel is removably secured to the bed $a$ of the machine by the bracket $w'$, as shown in Fig. 11. The double tip $t'$ when severed in the center by the cutting mechanism $m$ forms the two finished tips $t^2$ $t^2$ on the lacings, as shown in Fig. 28.

In the operation of my improved machine for manufacturing shoe, corset or similar lacings, the driving mechanism $b$ is driven by a belt on the pulley $b'$ in the usual way. The tip stock $u$ is fed intermittently to the cutting and forming dies of the tip forming mechanism $g$. The continuous strip of lacing material $t$ is brought from the can $x$, passed through the eye $d^6$ in the release lever of the stop motion $d$, and then through the tension guide $l^4$ of the left hand transverse lacing carrier mechanism $l$. As the lacing clamp carrier $e^5$ of the lacing feed mechanism $e$ passes the tension guide $l^4$, the jaws of the carrier close onto the strip of lacing material and draw the same into the machine the length of one lacing. The tension guide $l^4$ now moves back and places the strip of lacing material in the dies of the tip forming mechanism $g$ and simultaneously the jaws of the carrier $e^5$ pass between the jaws $k^5$ and $k^9$ on the slides of the right hand transverse lacing carrier mechanism $k$. The jaws $k^5$ and $k^9$ close onto the lacing material and the jaws of the carrier $e^5$ open by action of the cam $e^{12}$ on the lacing carrier mechanism. The strip of lacing material is now held by the jaws $k^5$ and $k^9$ of the right hand transverse lacing carrier $k$ and the tension guide $l^4$ of the left hand transverse lacing carrier $l$. The double tip $t'$ is now formed on the strip of lacing material $t$ by the dies of the tip forming mechanism $g$, as shown in Figs. 24 and 25. The inner ends of the fingers $n^4$ $n^4$ of the stretch eliminating mechanisms $n$ $n$ now drop down to receive the lacing. The closed jaws $k^5$ and $k^9$ are now moved into their extreme forward position to bring the lacing over the fingers of the stretch eliminating mechanisms $n$ $n$, and the tension guide $l^4$ moved into its extreme forward position to bring the double tip $t'$ into the cutting mechanism $m$. The fingers $n^4$ $n^4$ of the stretch eliminating mechanisms $n$ $n$ now close onto the lacing, loosely holding the same between the fingers and the underside of the supports $n'$ $n'$, as shown in Fig. 5. The cutting mechanism $m$ now cuts the double tip $t'$ in the center, severing the lacing and forming a finished tip $t^2$ on each end of the severed lacing, as shown in Fig. 28. The jaws $k^5$ and $k^9$ of the right hand transverse lacing carrier mechanism $k$ now open and the forked end $o^2$ of the release motion $o$ is depressed and forces the lacing out of the jaws. The lacing is now loosely held by the fingers $n^4$ $n^4$ until the stretch of the lacing is eliminated, when the fingers are opened and the finished lacing allowed to drop onto an arm $p^3$ of the rotatable lacing receiver $p$. When an arm of the lacing receiver $p$ has received a gross (144) of the finished lacings, the counting mechanism $r$ acts to give one-quarter of a revolution to the lacing receiver. This moves the filled arm of the receiver out of the receiving position and brings an empty arm into the position to receive the next gross of lacings. These operations are continuous and may be repeated indefinitely.

The machine may be adjusted for different lengths of lacings by adjusting the frame $k'$ of the right hand transverse lacing carrier $k$ lengthwise on the guide rail $a^7$, adjusting the frame $p^4$ for supporting the rotatable lacing receiver p on the guide rail a⁷, adjusting the cams on the cam shafts 32 and 33, and adjusting the cam e¹² on the frame e³ of the lacing feed mechanism e.

It is evident that the continuous strip of lacing material t may be fed to the machine from a reel supported in any suitable way or position, without materially affecting the spirit of my invention.

Having thus described my invention, I claim as new and desire to secure by Letters Patent;—

1. In a machine for manufacturing lacings, means for feeding the lacing material, means for applying a double tip to such material, means for cutting the double tip and severing the lacing, means for holding the completed lacings adjacent their ends, a receiver and support for the completed lacings underlying said holding means and embodying a plurality of horizontal arms to support the completed lacings, means to operate said receiver at predetermined intervals, and means to operate said holding means to permit the completed lacings to gravitate and be supported at an intermediate point by said receiver.

2. In a machine for manufacturing lacings, the combination with means for feeding the lacing material, and means for applying tips thereto, of means for receiving the completed lacings, and means for engaging the completed lacings and moving the same to aline with said receiving means so that the lacings will gravitate onto said receiving means and be supported thereby.

3. In a machine for manufacturing lacings, means for feeding a continuous strip of lacing material into the machine, means for applying a double metallic tip to the lacing material, means for cutting the tip and severing the lacing, means for holding the completed lacing until the stretch of the same is eliminated, and receiving means disposed to engage said lacing at an intermediate point after release from said last named means.

4. In a machine for manufacturing lacings, the combination of means for feeding and tipping the material, of a receiver, stretch eliminating means to hold the completed lacings adjacent their ends, and means to move said stretch eliminating means to overlie said receiver and to release the lacings therefrom whereby the lacing may gravitate onto said receiver.

5. In a machine for manufacturing lacings, means for feeding lacing material, means for applying a double tip to said material, means for cutting the tip, means for moving said material transversely to present the same to said cutting means, means to engage and hold said completed lacing to eliminate the stretch therefrom, means to release said lacing from said last named means, and means to receive said lacings and support the same upon their gravitation from said holding means.

6. In a machine for manufacturing lacings, means for feeding a strip of lacing material, means for applying a double tip to said material, cutting means, means to carry said material to said cutting means, stretch eliminating mechanism, a rotary receiver to receive and support the completed lacings as they gravitate from said mechanism, and means to operate the receiver to present different receiving portions thereof to said stretch eliminating mechanism whereby a predetermined number of lacings may be received by said receiver.

7. In a machine for manufacturing lacings, means for feeding a continuous strip of lacing material into the machine, means for applying a double metallic tip to the lacing material, means for cutting the tip and severing the lacing, a rotatable lacing supporting receiver adapted to receive and support the completed lacings, a counting mechanism, means for connecting the counting mechanism with the rotatable lacing receiver, whereby the receiver is given an intermittent rotary movement, as described.

8. In a machine for manufacturing lacings, means for feeding lacing material, means for applying a double tip thereto, stretch eliminating means for moving the lacing after the tipping operation to bring the same to be engaged by said stretch eliminating mechanism, cutting mechanism for severing the double tip, and means for releasing the completed lacings after the cutting operation from said stretch eliminating means.

9. In a machine for manufacturing lacings, the combination of a main driving mechanism operatively connected with a back cam shaft, a center cam shaft, slip gearing connecting the back and center cam shafts, a transverse lacing carrier mechanism, and means for operatively connecting the transverse lacing carrier mechanism with the back and center cam shafts, as described.

10. In a machine for manufacturing lacings, the combination of a main driving mechanism operatively connected with a back cam shaft, a center cam shaft, slip gearing connecting the back and center cam shafts, a lower cam shaft, means for connecting the lower cam shaft with the driving mechanism, a transverse lacing carrier mechanism having a tension guide, means for feeding a continuous strip of lacing material to the machine through the tension guide, and means for operatively connecting the transverse lacing carrier mechanism with the center and lower cam shafts, as described.

11. In a machine for manufacturing lacings, the combination with means for feeding, tipping and cutting the lacing material, of stretch eliminating mechanism to support the completed lacing, a multi-arm receiver to receive the completed lacings as they gravitate from said stretch eliminating mechanism, and means for rotating said receiver to bring the individual arms thereof to a position to engage the lacings when released.

12. In a machine for manufacturing lacings, the combination of a bed supported on a frame, a driving shaft carrying the driving mechanism and supported in bearings on the bed, a back cam shaft operatively connected with the driving shaft, a center cam shaft, slip gears connecting the center cam shaft with the back cam shaft, a lacing feed mechanism operatively connected with the back cam shaft, a lower cam shaft supported in bearings under the bed, means for operatively connecting the lower cam shaft with the driving shaft, a counting mechanism supported on the frame under the bed, and means for operatively connecting the counting mechanism with the lower cam shaft, as described.

13. In a machine for manufacturing lacings, a bed supported on a frame, a guide rail on the bed, a frame adjustably secured to the guide rail, a rotatable lacing receiver supported by the frame, a counting mechanism supported on the frame of the machine, means for operating the counting mechanism, and means for operatively connecting the counting mechanism with the rotatable lacing receiver, whereby the receiver is given an intermittent rotary motion for each gross of lacings received, as described.

14. In a machine for manufacturing lacings, means for feeding a continuous strip of lacing material into the machine, a double tip forming mechanism, a cutting mechanism adapted to cut the double tip centrally and sever the lacing, and means for giving a transverse movement to the strip of lacing material to carry the same first to the tip forming mechanism and then to the cutting mechanism, as described.

15. In a machine for manufacturing lacings, the combination of the following instrumentalities: a driving mechanism, a lacing feed mechanism, a double tip forming mechanism, a tip cutting mechanism, mechanism for holding the completed lacing until the stretch of the same is eliminated, a rotatable lacing receiver, a counting mechanism, means for operating the counting mechanism, and means for operatively connecting the counting mechanism with the rotatable lacing receiver to give an intermittent rotary motion to the receiver, as described.

16. In a machine for manufacturing lacings, the combination of the following instrumentalities: a driving mechanism, a continuous lacing feed mechanism, a double tip forming mechanism, a tip cutting mechanism, means for giving a transverse movement to the lacing, a rotatable lacing receiver, a counting mechanism, means for connecting the counting mechanism with the driving mechanism, and means for operatively connecting the counting mechanism with the rotatable lacing receiver, as described.

17. In a machine for manufacturing lacings, the combination of the following instrumentalities: a driving mechanism, a lacing feed mechanism, transverse lacing carrier mechanisms, a double tip forming mechanism, a tip cutting mechanism, a rotatable lacing receiver, a counting mechanism, means for connecting the counting mechanism with the driving mechanism, means for connecting the counting mechanism with the rotatable lacing receiver, and means for adjusting the rotatable lacing receiver lengthwise on the machine for different lengths of lacings, as described.

18. In a machine for manufacturing lacings, the combination of the following instrumentalities: a driving mechanism, a lacing feed mechanism, an automatic stop motion operatively connected with the driving mechanism and the lacing, a transverse lacing carrier mechanism having jaws adapted to grasp the lacing, means for adjusting the transverse lacing carrier mechanism lengthwise of the machine, a release motion adapted to force the lacing out of the jaws of the lacing carrier, a transverse lacing carrier mechanism having a tension guide for the lacing, a rotatable lacing receiver, a counting mechanism, means for connecting the counting mechanism with the driving mechanism, and means for connecting the counting mechanism with the rotatable lacing receiver, as described.

19. In a machine for manufacturing lacings, the combination of the following instrumentalities: a bed $a$ supported on a frame, a driving mechanism $b$ on the bed operatively connected with a back cam shaft 32, a center cam shaft 33, and a lower cam shaft 34, an operating lever $c$ connected to the driving mechanism through a clutch, an automatic stop motion $d$ connected to the operating lever $c$ and operated by a knot in a strip of lacing material $t$, a lacing feed mechanism $e$, a lacing feed driving mechanism $f$, a double tip forming mechanism $g$, a tip forming operating mechanism $h$, a feed roll mechanism $i$, a transverse lacing carrier mechanism $k$ having jaws adapted to grasp the lacing, a transverse lacing carrier mechanism $l$ having a tension guide for the lacing, a tip cutting mechanism $m$ adapted to cut a double tip centrally and sever the lacing, stretch eliminating mechanisms $n$ $n$ $n$ adapted to loosely hold the completed lacing until the stretch of the same is eliminated, a release motion $o$ adapted to force the lacing out of the jaws of the transverse lacing carrier mechanism $k$, a rotatable lacing receiver $p$ having arms adapted to receive the completed lacing, a counting mechanism $r$, means for connecting the counting mechanism with the lower cam shaft 34, means for connecting the counting mechanism $r$ with the rotatable lacing receiver $p$, a reel $w$ for holding a continuous strip of thin metal tip stock, means for indenturing the tip stock, a can $x$ or other means for holding a continuous strip of lacing material $t$, and means for adjusting the transverse lacing receiver $p$ lengthwise of the machine for different lengths of lacings, as described.

20. In a machine for manufacturing lacings, the combination with means for feeding, tipping and cutting the lacing material, of stretch eliminating mechanism, a multi-arm receiver disposed to receive the lacings as they gravitate from said stretch eliminating mechanism, and means to rotate said receiver at periods determined by the number of lacings received by the individual arms.

21. In a machine for manufacturing lacings, means for feeding a strip of lacing material, a double tip forming mechanism, a cutting mechanism to cut said tip centrally and sever the lacing, means for first carrying said material to the tip forming mechanism and then to the cutting mechanism, means to receive the lacings after completion, and means to release said lacings from said carrying means to permit the same to gravitate to be received by said receiving means.

22. In a machine of the character described, the combination with mechanism for feeding, tipping, and cutting the tips and lacing material, of receiving means for the completed lacings having supporting parts, and means for operating said supporting means to successively present the receiving parts thereof to receive the completed lacings at predetermined intervals determined by the number of lacings to be received by the individual supporting parts.

23. In a machine of the character described, the combination with mechanism for feeding, tipping, and cutting the tips and lacing material, of stretch eliminating mechanism embodying devices to engage the ends of the completed lacings, a receiver disposed so as to engage the released lacings at an intermediate point, and means for operating said devices to release the lacings and permit the same to gravitate to said receiver.

24. In a machine for manufacturing lacings, a receiver for receiving and supporting the completed lacings, means for feeding the lacing material, means for applying tips thereto, means to engage the ends of the completed lacings and to support the same and for carrying the lacings to overlie said receiver, and means to release said lacings from said last named means to permit the same to gravitate onto said receiver.

25. In a machine for manufacturing lacings, means for feeding the lacing material, means for tipping the material, means for cutting said tips and severing the lacing material, stretch eliminating mechanism, to support the completed lacings adjacent their ends, and a receiver disposed to operate beneath said stretch eliminating mechanism and at a point substantially central of the length of the lacing.

26. In a machine for manufacturing lacings, means for feeding lacing material, means for applying tips thereto, means to engage and hold said completed lacings to eliminate stretch therefrom, and means to release the completed lacings from said last named means.

27. In a machine of the class described, in combination, mechanism for applying metal blanks to a lace and cutting said blanks and lace to form tipped lacings, and mechanism coöperating with said tipped lacing-forming mechanism for automatically assembling the tipped lacings as they are formed, substantially as described.

28. In a machine of the class described, in combination, mechanism for applying metal blanks to a lace and cutting said blanks and lace to form tipped lacings, mechanism coöperating with said tipped lacing-forming mechanism for automatically assembling the tipped lacings as they are formed, and mechanism coöperating with said lacing forming mechanism and with said assembling mechanism for automatically assembling the tipped lacings in predetermined numbers, substantially as described.

29. In a machine of the class described, in combination, mechanism for forming tipped lacings from a continuous length of lace, an assembling mechanism coöperating with said lacing forming mechanism to receive the individual tipped lacings and lay them lengthwise in predetermined numbers, a receptacle located in line with said assembling mechanism and in which said lacings are laid, and means for moving said receptacle out of line with said assembling mechanism when a predetermined number of lacings have been assembled, substantially as described.

In testimony whereof I have signed my name to this specification in the presence of two subscribing witnesses

WILLIAM H. CHURCH.

Witnesses:
 ADA E. HAGERTY,
 J. A. MILLER, Jr.